(12) United States Patent
Sun et al.

(10) Patent No.: US 7,628,328 B2
(45) Date of Patent: Dec. 8, 2009

(54) OPTICAL SYSTEM FOR SENSING, IDENTIFICATION AND DRIVING

(75) Inventors: Tsung-Ting Sun, Taipei Hsien (TW); Hsuan-Kai Huang, Taipei Hsien (TW)

(73) Assignee: Edison Opto Corporation, Taipei Hsien (TW)

( * ) Notice: Subject to any disclaimer, the term of this patent is extended or adjusted under 35 U.S.C. 154(b) by 265 days.

(21) Appl. No.: 11/802,372

(22) Filed: May 22, 2007

(65) Prior Publication Data
US 2008/0291788 A1 Nov. 27, 2008

(51) Int. Cl.
*G06K 7/10* (2006.01)
(52) U.S. Cl. ............... 235/454; 235/375; 235/380; 235/382; 235/382.5; 235/487; 235/492; 235/451
(58) Field of Classification Search .......... 235/375, 235/380–382.5, 454, 487, 492
See application file for complete search history.

(56) References Cited

U.S. PATENT DOCUMENTS

| | | | | |
|---|---|---|---|---|
| 6,908,035 B2* | 6/2005 | Bench et al. | ............... | 235/491 |
| 7,104,449 B2* | 9/2006 | Han et al. | ............... | 235/454 |
| 2005/0247776 A1* | 11/2005 | Harper et al. | ............... | 235/380 |
| 2006/0118621 A1* | 6/2006 | Burchette, Jr. | ............... | 235/380 |

* cited by examiner

*Primary Examiner*—Thien M. Le
*Assistant Examiner*—Tuyen K Vo
(74) *Attorney, Agent, or Firm*—Rosenberg, Klein & Lee

(57) ABSTRACT

An optical system for sensing, identification and driving is applied to drive a working system executing at least one preset assignment. The optical system comprises an optical identification card and a driving unit. The identification card comprises at least one driving light source for projecting at least one driving light beam having a driving optical property. The driving unit has a standard optical property for representing the preset assignment. When the driving optical property complies with the standard optical property, the driving light beam drives the working system executing the preset assignment that the standard optical property represents.

10 Claims, 6 Drawing Sheets

OPTICAL SYSTEM FOR SENSING, IDENTIFICATION AND DRIVING

FIELD OF THE INVENTION

The present invention relates to a system for identification and driving, and more particularly to a system for engaging identification by optical-sensing, so as to drive a working system executing at least one preset assignment.

BACKGROUND OF THE INVENTION

In daily life, it is very convenient for the most users to carry on the identification cards, so that excepting for the function of status-identification, the identification cards are usually combined with many kinds of database, facilities or systems to have additional functions of driving the facilities or the systems executing many preset assignments. For example, when the identification cards are combined with finance data, they are served as ATM (Automatic Teller Machine) cards, credit cards or store cards, etc., to drive ATMs or other financial machines executing the preset assignments of drawing money, debiting, or storing value.

When the identification cards are combined with access management facilities, they are served as access cards for driving the access management facilities executing the preset assignment of access management. When the identification cards are combined with production systems, they are served as production management and control cards for driving the production systems executing the preset assignment of production management and control.

For further explaining how to drive a working system executing preset assignment via an identification card, a prior art is disclosed as follows. Please refer to FIG. 1 and FIG. 2, wherein FIG. 1 illustrates a perspective view of a conventional identification card; and FIG. 2 is a functional block diagram illustrating a conventional identification and driving system, which drives a working system executing at least one preset assignment. As shown in the figures, an identification and driving system 100 comprises an identification card 1, an identification processing module 2, a display unit 3 and an operation interface 4, so as to drive a working system 5 executing at least one preset assignment.

The identification card 1 comprises a chip 11, a magnetic strip 12 and a bar code 13 for recording the status that the identification card 1 represents, and for further recording the authorization limitation of operating the working system 5. The identification processing module 2 comprises a read unit 21, a processing unit 22, a database 23 and a status identification program 24. The processing unit 22 respectively communicates to the read unit 21, the database 23 and the status identification program 24, wherein the database 23 comprises a status data region 231 and an authorization limitation data region 232 for respectively pre-storing data of three different statuses and authorization limitations.

The display unit 3 and the operation interface 4 respectively communicates to the processing unit 22, and the display unit 3 is applied to display three operation windows 31, 32 and 33 respectively representing said three different statuses and authorization limitations. The working system 5 comprises three sub-working systems 51, 52 and 53 with respect to the operation windows 31, 32 and 33, and further executes three different preset assignments with respect to said three different statuses and authorization limitations.

When a user puts the identification card 1 to a readable region of the read unit 21, the read unit 21 can read the chip 11, the magnetic strip 12 and the bar code 13, transfer a reading result of reading the chip 11, the magnetic strip 12 and the bar code 13 to an input signal S1, and transmit the input signal S1 to the processing unit 22 to progress relative processing. After receiving the input signal S1, the processing unit 22 downloads the status identification program 24, and compares the input signal S1 with data of authorization limitation pre-stored in the database 23, so as to identify the authorization limitation that the identification card 1 represents.

When the comparison result complies with the first status and authorization limitation of above three statuses and authorization limitations, the operation window 31 can be automatically opened via the processing unit, and a driving signal S2 is transmitted to the sub-working system 51 of the working system 5, so as to drive the sub-working system 51 executing the preset assignment with respect to the first status and authorization limitation. Besides, the user further can operate the operation interface 4 via watching the operation window 31 for controlling the output of the driving signal S2.

People skilled in the related arts can easily realize that data stored on the chip 11, the magnetic strip 12 and the bar code 13 are usually transferred to the input signal S1 in a digital form, hereinafter is defined as a digital form input signal, so that data can be easily copied by a card skimming device. Thus, it is easy to analyze data stored in the chip 11, the magnetic strip 12 and the bar code 13 by digital encoding and decoding techniques.

SUMMARY OF THE INVENTION

The problems intend being solved in the present invention and the objects of the present invention are described as follows:

Making a summary from above prior arts, no matter identifying the status or authorization limitation by reading the chip, the magnetic strip or the bar code, it is necessary to transfer data to the digital form input signal, and it is further necessary to transmit the digital form input signal to the processing unit. Thus, data can be easily copied by card skimming device. Nevertheless, data stored in identification card will be easily be analyzed by digital encoding or decoding techniques. With the negative influences as mentioned, the identification and driving system can be invaded and destroyed easily to make that the working system cannot work normally.

Thus, the primary object of the present invention provides an optical system for sensing, identification and driving, wherein an optical identification card is arranged with at least one driving light source for projecting at least one driving light beam being directly identified by a drive unit. After passing through an identification step, the driving light beam can drive a working system executing at least one preset assignment.

The secondary object of the present invention provides an optical system for sensing, identification and driving, wherein an optical identification card is arranged with at least one driving light source for projecting at least one driving light beam being directly identified by a filtering element to prevent the optical identification card from being illegally copied.

Means of the Present Invention for Solving Problems:

Means of the present invention for solving the problems as mentioned above provides an optical system for sensing, identification and driving, so as to drive a working system executing at least one preset assignment. The optical system comprises an optical identification card and a driving unit.

The identification card comprises at least one driving light source for projecting at least one driving light beam having a driving optical property. The driving unit has a standard optical property representing the preset assignment.

When the driving optical property complies with the standard optical property, the driving light beam drives the working system executing the preset assignment that the standard optical property represents. On the contrary, when the driving optical property does not comply with the standard optical property, the driving light beam cannot drive the working system executing the preset assignment that the standard optical property represents. In a preferred embodiment of the present invention, it is particular to use a filtering element to identify the driving light beam.

Effects of the Present Invention with Respect to Prior Arts:

Comparing with the identification technique in the prior art, the present invention can identify the optical identification card without transmitting the digital form input signal, and without using digital encoding and decoding technique, either. Thus, data stored in the identification card are not easily copied by the card skimming device any more. Moreover, through the identification technique of the present invention, the optical system (for sensing, identification and driving) and the working system will not be easily destroyed by the invasions of hackers anymore. People skilled in the related arts can easily realize that the operation safety of the working system can be obviously upgraded via the technique disclosed in the present invention.

The devices, characteristics, and the preferred embodiment of this invention are described with relative figures as follows.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Due to that the optical system for sensing, identification and driving as provided in accordance with the present invention can be widely applied to drive many kinds of working systems, the combined applications are too numerous to be enumerated and described, so that only a preferred embodiment is disclosed as follows for representation.

Figure 1:
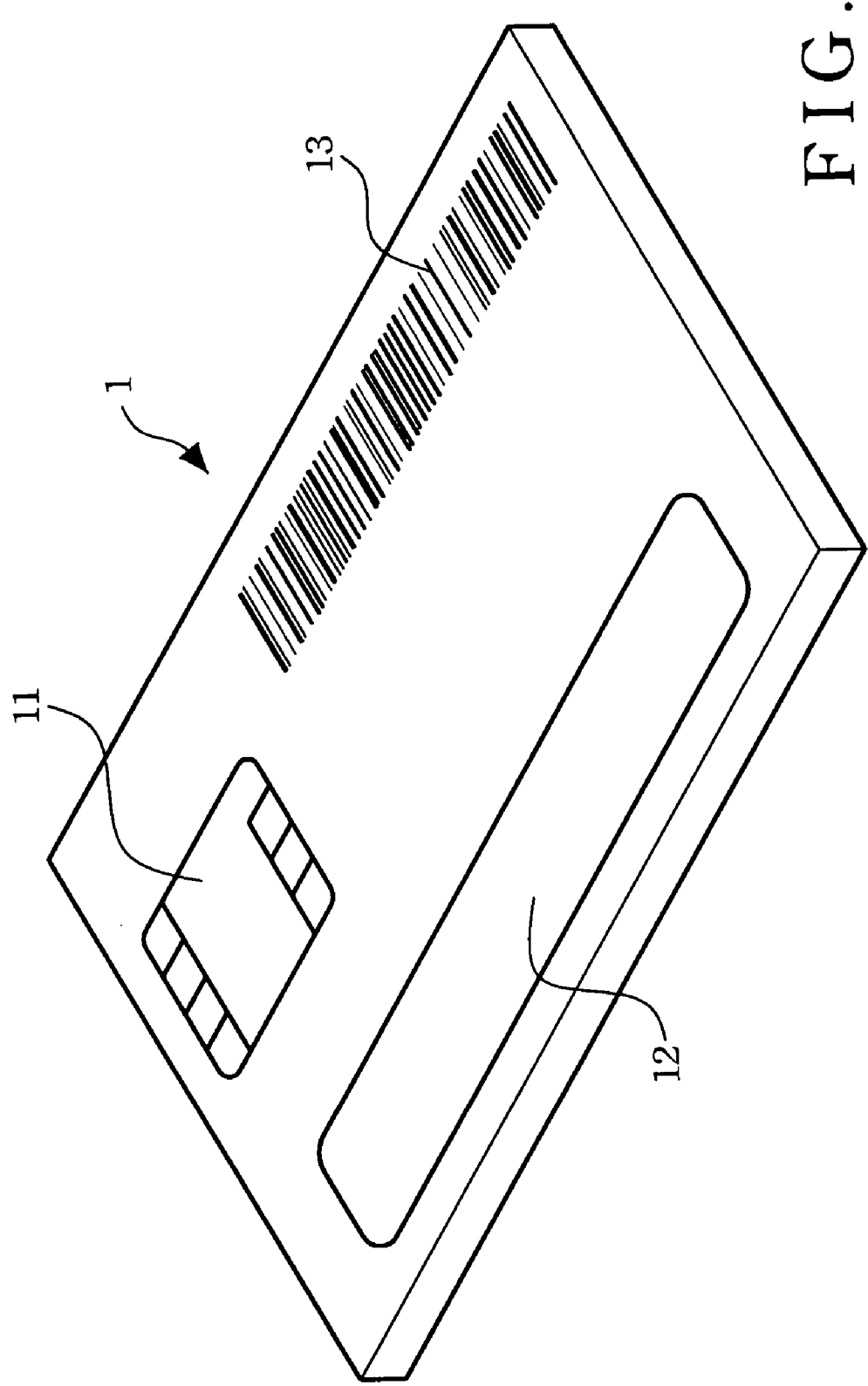
FIG. 1 illustrates a perspective view of a conventional identification card.
Figure 2:
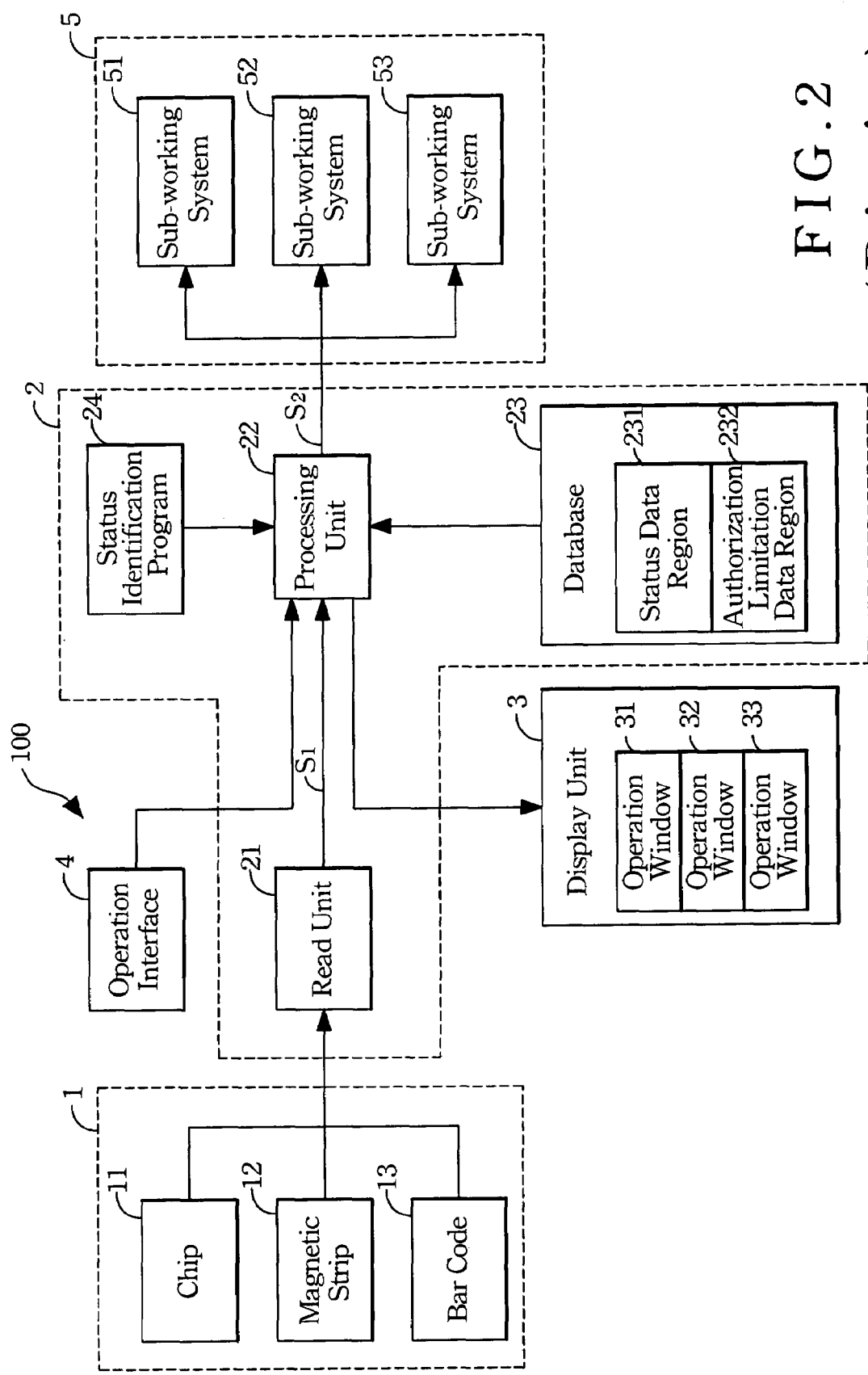
FIG. 2 is a functional block diagram illustrating a conventional identification and driving system, which drives a working system executing at least one preset assignment.
Figure 3:
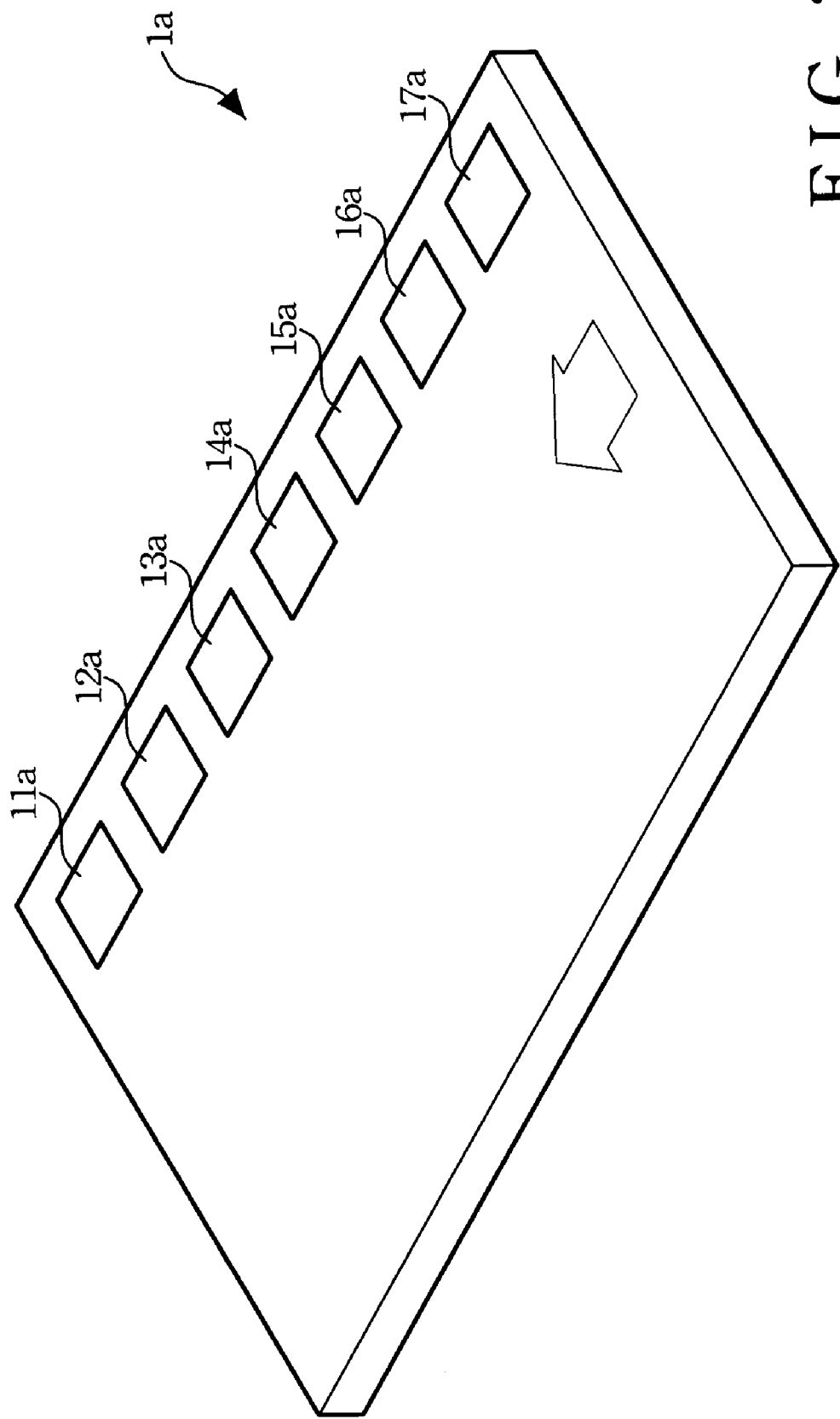
FIG. 3 illustrates a perspective view of an optical identification card in accordance with a preferred embodiment of the present invention.
Figure 4:
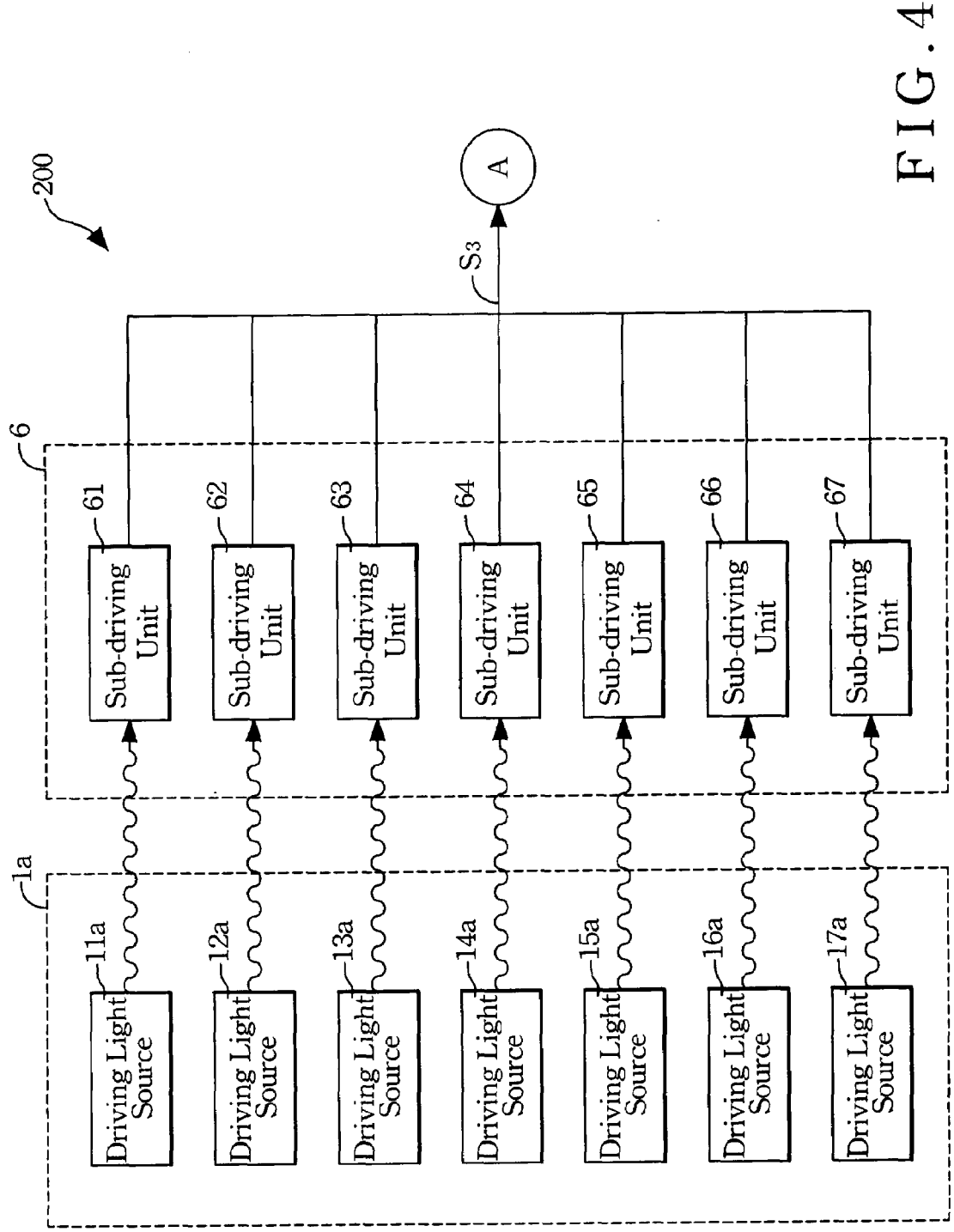
FIG. 4 illustrates the first part of a functional block diagram in accordance with the preferred embodiment of the present invention.
Figure 5:
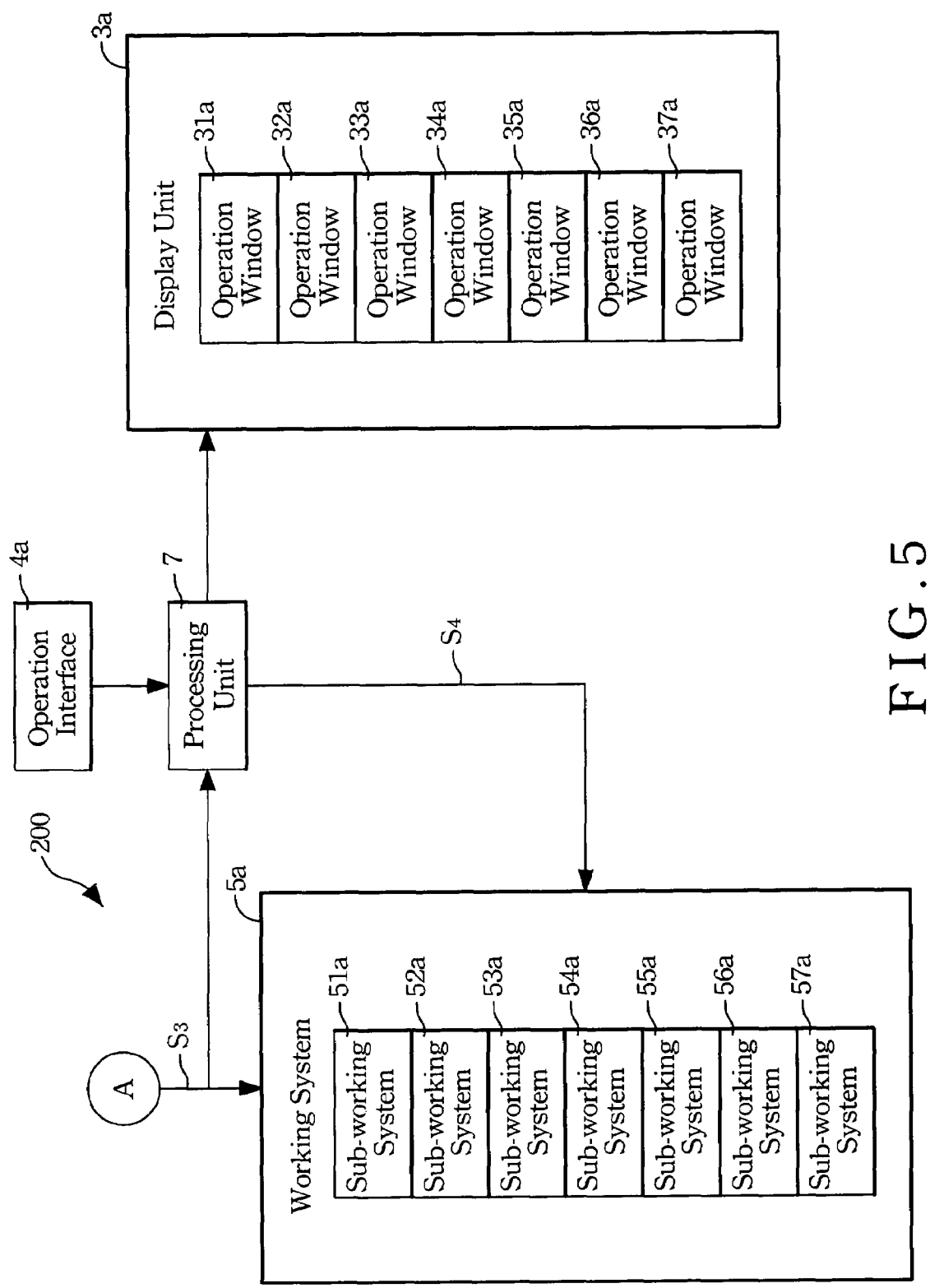
FIG. 5 illustrates the second part of the functional block diagram in accordance with the preferred embodiment of the present invention.

Please refer to FIG. 3 to FIG. 5, wherein FIG. 3 illustrates a perspective view of an optical identification card in accordance with a preferred embodiment of the present invention; FIG. 4 illustrates the first part of a functional block diagram in accordance with the preferred embodiment of the present invention; and FIG. 5 illustrates the second part of the functional block diagram in accordance with the preferred embodiment of the present invention. As shown in the figures, an optical system 200 for sensing, identification and driving comprises an optical identification card 1a, a display unit 3a, an operation interface 4a, a driving unit 6a and a processing unit 7, so as to drive a working system 5a executing at least one preset assignment.

The identification card 1a has seven driving light sources 11a, 12a, 13a, 14a, 15a, 16a and 17a, so as to respectively project seven driving light beams with seven driving optical properties. The display unit 3a and the operation unit 4a are communicated with the processing unit 7, the display unit 3a can display seven operation windows 31a, 32a, 33a, 34a, 35a, 36a and 37a, and the operation interface 4a is also communicated with the processing unit 7.

The driving unit 6 is communicated with the processing unit 7 and the working system 5a, and comprises seven sub-driving units 61, 62, 63, 64, 65, 66 and 67 respectively having seven different standard optical properties. The working system 5a is communicated with the driving unit 6 and the processing unit 7, and comprises seven sub-working systems 51a, 52a, 53a, 54a, 55a, 56a and 57a.

The sub-working systems 51a, 52a, 53a, 54a, 55a, 56a and 57a are applied to execute seven different preset assignments respectively, wherein the standard optical property of sub-driving system 61 is with respect to the operation window 31a, and represents the preset assignment that the sub-working system 51a is assigned to execute; and the standard optical property of sub-driving system 62 is with respect to the operation window 32a, and represents the preset assignment that the sub-working system 52a is assigned to execute; and the relation of the rest related elements can be analogized.

When a user (not shown in the figures) puts the optical identification card 1a to a sensible region of the driving unit 6, the driving light beam projected from the driving light source 11a can be sensed by the sub-driving unit 61 of the driving unit 6, and the sub-driving unit 61 can identify whether the driving optical property of the driving light beam complies with the standard optical property of the sub-driving unit 61. When the driving optical property of driving light beam complies with the standard optical property of the sub-driving unit 61, the sub-driving system 61 can sense the driving light beam, transmit a driving signal S3 to the working system 5a, and drive the sub-working system 51a executing the preset assignment with respect to the sub-working system 51a.

Meanwhile, the driving signal S3 is also transmitted to the processing unit 7 to automatically open the operation window 31a with respect to the sub-driving unit 61, and to display that the driving signal S3 driving the working system 5a executing the preset assignment, which the standard optical property of the sub-driving unit 61 represents. Hereafter, the user can input proper commands via the operation interface 4a to make the processing unit 7 transmit a control signal S4 to the sub-working system 51a of the working system 5, so as to control the working system 5a executing the preset assignment, which the standard optical property of the sub-driving unit 61 represents.

On the contrary, when the driving optical property of driving light beam does not comply with the standard optical property of the sub-driving unit 61, the sub-driving system 61 cannot sense the driving light beam. Then, it is obviously that there will be no driving signal S3 being transmitted to the working system 5a under this situation. Thus, the driving light beam cannot drive the sub-working system 51a of the working system 5a executing the preset assignment with respect to the sub-working system 51a.

Besides, in the preferred embodiment, the standard optical property is a standard filtering wavelength, and the driving optical property is a driving wavelength of the driving light beam. Thus, in the following description, the standard optical property and the driving optical property will be respectively replaced by the standard filtering wavelength and the driving wavelength.

Following to above description, the characteristic of the sub-driving unit 61 will be further disclosed to explain how the sub-driving unit 61 identifies whether the driving wavelength complies with the standard filtering wavelength.

Figure 6:
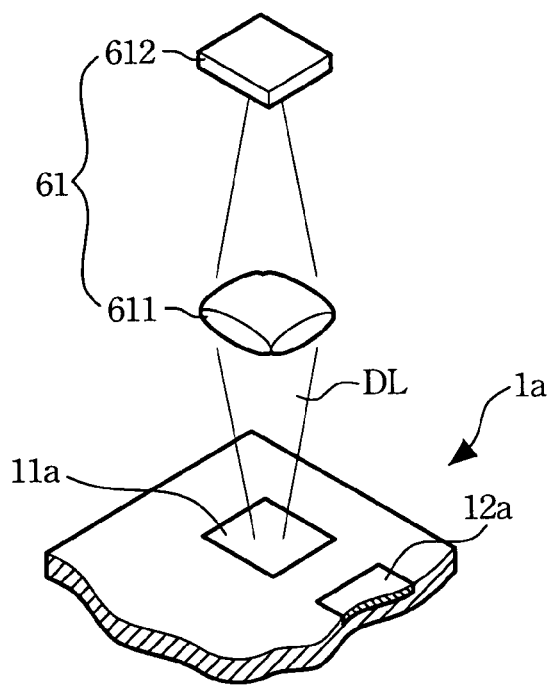
FIG. 6 illustrates a sub-driving unit can sense the driving light beam when the driving wavelength equals the standard filtering wavelength.
Figure 7:
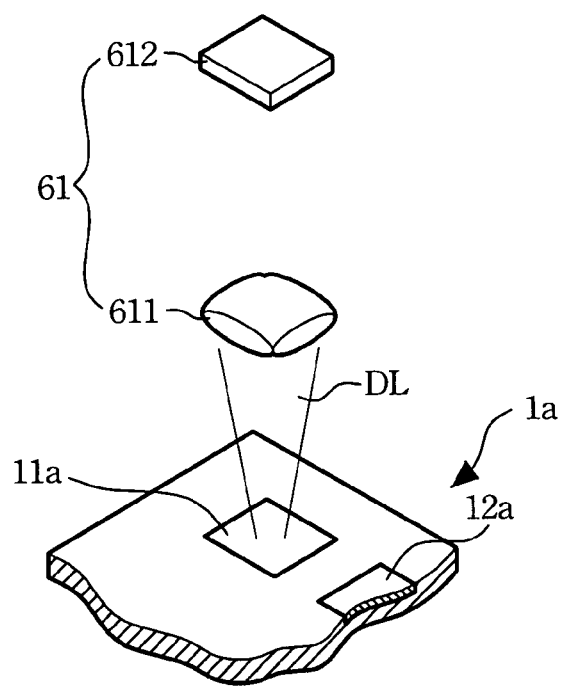
FIG. 7 illustrates a sub-driving unit cannot sense the driving light beam when the driving wavelength does not equal the standard filtering wavelength.

Please refer to FIG. 6 and FIG. 7, wherein FIG. 6 illustrates a sub-driving unit can sense the driving light beam when the driving wavelength equals the standard filtering wavelength; and FIG. 7 illustrates a sub-driving unit cannot sense the driving light beam when the driving wavelength does not equal the standard filtering wavelength. As shown in FIG. 6, the sub-driving unit 61 comprises a filtering element. In the preferred embodiment, the filtering element is a light-concentration filter 611 having the standard filtering wavelength. Meanwhile, the sub-driving unit 61 further has a sensing and driving interface 612, which can be an optical sensing and driving circuit.

When the driving light source 11a is located in a sensible region of the sub-driving unit 61, and the driving wavelength of the driving light beam DL projected from the light source 11a equals the standard filtering wavelength of the light-concentration filter 611, the driving light beam can pass through the light-concentration filter 611. Following up, the light-concentration filter can concentrate the driving light beam DL, and then the driving light beam DL projects to the sensing and driving interface 612 for increasing the intensity of the driving light beam DL. When the driving light beam DL projects to the sensing and driving interface 612, the sensing and driving interface 612 can generate an optical inducting voltage to accordingly generate the driving signal S3 to drive the sub-working system 51a of the 5a executing the preset assignment that the standard filtering wavelength of the light-concentration filter 611 represents.

On the contrary, as shown in FIG. 7, when the driving wavelength of the driving light beam DL projected from the driving light source 11a does not equal the standard filtering wavelength of the light-concentration filter 611, the driving light beam DL will be blocked by the light-concentration filter 611 without projecting to the sensing and driving interface 612, so that the sub-driving system 61 cannot sense the driving light beam DL. Then, it is obviously that there will be no driving signal S3 being generated to transmit to the working system 5a under this situation. Thus, the driving light beam DL cannot drive the sub-working system 51a of the working system 5a executing the preset assignment that the standard filtering wavelength represents. Besides, the composed elements and the functions of the sub-driving units 62, 63, 64, 65, 66 and 67 are the same as, or similar to, those of the sub-driving unit 61.

For further describing above techniques, a preferred application of the preferred embodiment will be disclosed as follows. Please refer to Table 1 and Table 2, wherein Table 1 presents the synopsis between standard filtering wavelength and preset assignment; and Table 2 presents the synopsis between driving light source and preset assignment capable of executing. Suppose that the working system 5a is an integrated management system of a company; the working system 5a is combined with the optical system 200 as disclosed in the present invention; and the sub-working systems 51a, 52a, 53a, 54a, 55a, 56a and 57a of the working system 5a are applied to executing the preset assignments in accordance with Table 1.

Moreover, suppose that a RD (Research and Development) engineer is given with the optical identification card 1a, and the driving light sources 11a, 12a, 13a, 14a, 15a, 16a and 17a of the optical identification card 1a can project the driving light beams with the driving wavelengths of 400 nm, 400 nm, 400 nm, 540 nm, 560 nm, 580 nm and 400 nm, respectively.

TABLE 1

Synopsis between standard filtering wavelength and preset assignment

| Sub-driving Unit | Standard filtering wavelength | Sub-working System | Operation Window | Preset Assignment |
| --- | --- | --- | --- | --- |
| 61 | 480 nm | 51a | 31a | Opening Personnel Database |
| 62 | 500 nm | 52a | 32a | Running Storage Management Program |
| 63 | 520 nm | 53a | 33a | Opening Finance Database |
| 64 | 540 nm | 54a | 34a | Running Production Management Modeling Program |
| 65 | 560 nm | 55a | 35a | Opening RD (Research and Development) Project Database |
| 66 | 580 nm | 56a | 36a | Opening IP (Intellectual Property) Database |
| 67 | 600 nm | 57a | 37a | Opening Automatic Production Line |

TABLE 2

Synopsis between driving light source and preset assignment capable of executing

| Driving Light Source | Driving Wavelength | Sub-Working System | Operation Window | Preset Assignment Capable of Executing |
|---|---|---|---|---|
| 11a | 400 nm | 51a Off | 31a Off | None |
| 12a | 400 nm | 52a Off | 32a Off | None |
| 13a | 400 nm | 53a Off | 33a Off | None |
| 14a | 540 nm | 54a On | 34a On | Running Production Management Modeling Program |
| 15a | 560 nm | 55a On | 35a On | Opening RD (Research and Development) Project Database |
| 16a | 580 nm | 56a On | 36a On | Opening IP (Intellectual Property) Database |
| 17a | 400 nm | 57a Off | 37a Off | None |

It will be known that from Table 1 and Table 2, when the RD engineer puts the optical identification card 1a to the sensible region, where the driving unit 6 can sense the driving light beams, the three operation windows 34a, 35a and 36a capable of mutual switching can be automatically opened, and the sub-working system 54a, 55a and 56a can be triggered to execute the three preset assignments of: running production management modeling program; opening RD (Research and Development) project database; and opening IP (Intellectual Property) database. Following up, the RD engineer further can operate the operation interface 4a, via watching the three operation windows 34a, 35a and 36a, to control the execution of the three preset assignments as mentioned.

In the preferred application of the preferred embodiment of the present invention, the optical system 200 is applied to be combined with the integrated management system; however, people skilled in related arts can easily realize that the present invention can be further combined with the financial management system, the access control system, database management system, and other devices, facilities or systems required to engage the step of identifying the statuses and authorization limitations.

In the preferred embodiment of the present invention, the standard optical property and the driving optical property are the standard filtering wavelength of the light-concentration filter 611, and the driving wavelength of the driving light beam DL, respectively. Therefore, it is necessary to identify the driving light beam DL by the light-filtering technique. However, in practice, a light-splitting technique also can be used to identify the driving light beam DL.

In this case, we can assemble seven light-splitting elements (not shown in the figures) within the sub-driving unit 61, 62, 63, 64, 65, 66 and 67 for replacing the light-concentration filter 611, so as to refract the driving light beam DL. The standard optical property is defined as a set projecting region where the sensing and driving interface 612 is capable of sensing the driving light beam DL refracted from the light-splitting element, and the driving optical property is defined as an actual projecting region where the driving light beam DL actually projects to after being refracted form the light-splitting element.

If the actual projecting region complies with the set projecting region, the driving signal S3 also can be generated and transmitted; on the contrary, if the actual projecting region does not comply with the set projecting region, the driving signal S3 cannot be generated and transmitted. Thus, it is able to identify the driving light beam DL through the light-splitting technique. Due to that people skilled in related arts can easily realize the light-splitting technique after reading above description, it is considered unnecessary to provide additional figures to explain more.

Nevertheless, for advancing the safety of use, the optical identification card 1a can be additionally assembled with a plurality of identification light source for projecting a plurality of identification light beams, and the driving unit can be additionally assembled with a plurality of optical sensors. Before engaging the identification technique of the present invention as mentioned above, it is able to execute an initial identification process of sensing the identification light beams by the optical sensors.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An optical system for sensing, identification and driving being applied to drive a working system executing at least one preset assignment, and comprising:

an identification card comprising at least one driving light source for projecting at least one driving light beam, which has a driving optical property; and a driving unit having at least one standard optical property representing the preset assignment for sensing the driving light beam and identifying whether the driving optical property complies with the standard optical property;

wherein when the driving optical property complies with the standard optical property, the driving light beam drives the working system, via the driving unit, executing the preset assignment that the standard optical property represents; and when the driving optical property does not comply with the standard optical property, the driving light beam does not drive the working system executing the preset assignment that the standard optical property represents.

2. The optical system as claimed in claim 1, wherein the driving optical property is a driving wavelength of the driving light beam, the standard optical property is a standard filtering wavelength, and the driving unit comprises:

an filtering element having the standard filtering wavelength; and a sensing and driving interface for sensing the driving light beam;

wherein when the driving wavelength equals the standard filtering wavelength, the driving light beam passes through the filtering element, projects to the sensing and driving interface, and drives the working system, via the sensing and driving interface, executing the preset assignment that the standard filtering wavelength represents; and when the driving wavelength does not equal the standard filtering wavelength, the driving light beam is blocked by the filtering element without driving the working system executing the preset assignment that the standard filtering wavelength represents.

3. The optical system as claimed in claim 2, wherein when the driving wavelength equals the standard filtering wavelength, the sensing and driving interface generates a driving signal to drive the working system executing the preset assignment that the standard filtering wavelength represents.

4. The optical system as claimed in claim 3, wherein the sensing and driving interface is an optical sensing and driving circuit, and when the driving light beam projects to the optical sensing and driving circuit, an optical inducting voltage is generated to generate the driving signal.

5. The optical system as claimed in claim 3, further comprising:
   a processing unit communicated with the driving unit for receiving and processing the driving signal; and
   a display unit communicated with the processing unit for displaying the driving signal driving the working system executing the preset assignment that the standard filtering wavelength represents.

6. The optical system as claimed in claim 5, wherein the display unit is applied to display at least one operation window with respect to the preset assignment that standard filtering wavelength represents.

7. The optical system as claimed in claim 6, further comprising an operation interface communicated with the processing unit for operating the operating window transmitting a control signal to control the working system executing the preset assignment that the standard filtering wavelength represents.

8. The optical system as claimed in claim 2, wherein the filtering element is a light-concentration filter, and when the driving wavelength equals the standard filtering wavelength, the driving light beam is projected to the sensing and driving interface after being concentrated by the light-concentration filter.

9. The optical system as claimed in claim 1, wherein the working system comprises at least one sub-working system for respectively executing the preset assignment.

10. The optical system as claimed in claim 1, wherein the driving unit comprises:
   a light-splitting element for refracting the driving light beam; and
   a sensing and driving interface for sensing the driving light beam refracted from the light-splitting element;
   wherein the standard optical property is defined as a set projecting region where the sensing and driving interface is configured to sense the driving light beam refracted from the light-splitting element, and the driving optical property is defined as an actual projecting region where the driving light beam actually projects after being refracted from the light-splitting element.

* * * * *